United States Patent [19]

Dilling

[11] Patent Number: 5,043,433
[45] Date of Patent: Aug. 27, 1991

[54] OLEUM SULFONATION OF LIGNINS
[75] Inventor: Peter Dilling, Isle of Palms, S.C.
[73] Assignee: Westvaco Corporation, New York, N.Y.
[21] Appl. No.: 428,953
[22] Filed: Oct. 30, 1989

Related U.S. Application Data

[60] Division of Ser. No. 324,320, Mar. 16, 1988, Pat. No. 5,043,434, which is a continuation-in-part of Ser. No. 298,677, Jan. 19, 1989.

[51] Int. Cl.$^5$ ............................................. C08H 5/02
[52] U.S. Cl. ................................... 530/500; 530/501
[58] Field of Search ................................ 530/500, 501

[56] References Cited

U.S. PATENT DOCUMENTS

| 2,280,600 | 4/1942 | Muller et al. | 530/500 |
| 2,323,022 | 6/1943 | Ferrari et al. | 530/500 |
| 2,680,113 | 6/1954 | Adler et al. | 530/500 |
| 2,789,974 | 4/1957 | Hagglund et al. | 530/500 |
| 2,976,235 | 3/1961 | Sperry | 530/500 |
| 2,985,643 | 5/1961 | Boomer et al. | 530/500 |
| 3,997,502 | 12/1976 | Schaupp | 524/423 |
| 4,069,217 | 1/1978 | Detroit et al. | 530/500 |
| 4,193,814 | 3/1980 | Shen | 530/500 |
| 4,384,997 | 5/1983 | Detroit | 530/501 |
| 4,427,584 | 1/1984 | LeGrand et al. | 530/500 |
| 4,728,727 | 3/1988 | Reintjes et al. | 530/500 |
| 4,739,040 | 4/1988 | Naae et al. | 530/500 |
| 4,739,041 | 4/1988 | Morrow et al. | 530/500 |
| 4,740,590 | 4/1988 | Dilling | 530/500 |

FOREIGN PATENT DOCUMENTS 1176243 10/1984 Canada .
1812042 2/1970 Fed. Rep. of Germany .
182076 4/1966 U.S.S.R. .

OTHER PUBLICATIONS

Polyfon F product bulletin from the Westvaco Corporation.

Primary Examiner—John Kight, III
Assistant Examiner—Frederick Krass
Attorney, Agent, or Firm—Terry B. McDaniel; Daniel B. Reece, IV; Richard L. Schmalz

[57] ABSTRACT

A sulfonated lignin composition suitable for use as an additive in other chemical compositions and processes having essentially complete water solubility in aqueous medium at all pH levels, and a method of producing such sulfonated water-soluble lignin products by reaction of an unsulfonated or a sulfonated starting lignin compound with oleum, while maintaining the temperature of the reaction below 40° C. for a sufficient time to sulfonate the same. Oleum sulfonation provide an increases the organically bound sulfonic acid content of the starting lignin compound of at least about 4.2 moles sulfonic acid per mole of lignin, while providing essentially complete water solubility of the product at all pH levels.

2 Claims, No Drawings

OLEUM SULFONATION OF LIGNINS

This application is a divisional of my commonly assigned, co-pending application Ser. No. 07/324,320) now U.S. Pt. No. 5,043,434, which is a continuation-in-part of my commonly assigned, co-pending U.S. Pat. application Ser. No. 07/298,677 filed Jan. 19, 1989 and entitled "Sulfonation of Lignins". The present invention is directed to the production of sulfonated lignin compositions suitable for use as additives in other chemical compositions and processes, and, more particularly, to a lignin sulfonated with oleum to produce a highly sulfonated lignin having essentially complete water solubility at all pH levels.

BACKGROUND OF THE INVENTION

Lignin is a complex, high-molecular weight polymer occurring naturally in close association with cellulose in plants and trees. In the paper-making industry, lignin may be recovered as a by-product of the cellulose product by two principal wood-pulping processes known as a sulfite process and a kraft process. In the sulfite process, lignin is solubilized from the cellulosic portion of the wood pulp by direct sulfonation, while the kraft process is based on an alkaline degradation mechanism causing cleavage $\beta$-aryl ether linkages in the polymeric lignin which sequentially result in chemical functions of the phenolic and carboxylic type. Kraft process lignin generally is isolated by acid precipitation from the black liquor of the pulping process at a pH below the pKa of the phenolic groups.

Depending on conditions under which the lignin is precipitated, the precipitated lignin may be either in the form of free acid lignin or a lignin salt. If lignin is precipitated at a high pH, such as about 9.5 to 10, the lignin is obtained in the form of a salt. If this lignin is further processed by washing, acidifying to a low pH, such as about 2 to 5, and further washed so as to be substantially free of salt and ash-forming ingredients, free acid lignin, known as "A" lignin, is obtained. A monovalent salt of lignin, such as an alkali metal salt or ammonium salt, is soluble in water, whereas free acid lignin and polyvalent metal salts of lignin are insoluble in water.

Lignin products are widely employed as additives in various chemical processes and compounds. Because of the high degree of chemical activity characteristic of lignin, it has been variously employed as a surfactant, extender, dispersant, reinforcement, absorbent, binder, sequestering agent, emulsifier and emulsion stabilizer, and as a stabilizing and protective colloid. Lignin is sold under the trademark Indulin ® by Westvaco Corporation of North Charleston, S.C. Sulfonated lignin compounds, particularly sodium salts of lignosulfonates, are widely employed as additives and dispersants in textile dyestuffs and printing pigments, and such products have been sold for a number of years under the trademarks Polyfon ® and REAX ® by Westvaco Corporation. The degree of sulfonation of lignin generally determines its water solubility at various pH levels, e. g., sodium salts of sulfonated lignins are generally water-soluble at alkaline and higher pH levels, while they are water-insoluble at lower or acid pH levels.

Lignosulfonate compounds obtained from the lignin by-product of a kraft pulping process may be produced by treatment of an aqueous solution of the same with an aldehyde compound at an alkaline pH to methylolate the lignin, followed by treatment with sodium sulfite or bisulfite at an acid pH to sulfomethylate the methylol group on the phenolic nucleus of the lignin molecule. The long side chain of the lignin molecule may also be sulfonated by treatment with a sulfite or bisulfite salt.

Napthylene sulfonate compositions suitable for use as additives and dispersants in other chemical compositions, and comparable in some ways to lignosulfonates, have been produced by sulfuric acid sulfonation of napthylene. It is known that benzene and other aromatic compounds can be sulfonated with concentrated sulfuric acid, but as the concentration of the water increases during a reaction, the rate of sulfonation decreases, the reaction rate being inversely proportional to the square of the water concentration. Reaction ceases when the acid concentration reaches a level characteristic of each compound, in the case of benzene, about 78% sulfuric acid.

Much thought has been devoted to methods of carrying out the sulfonation reaction to completion. One approach involves removal of the water as formed, the net result being substantially quantitative utilization of both hydrocarbon and acid. It is also understood that certain lignin materials heretofore have been treated with sulfuric acid, gaseous sulfur trioxide, and/or oleum at varying concentrations to sulfonate the same, but such treatments have not indicated that the sulfonated lignin products are sufficiently water-soluble to be useful commercially as additives in preparation of other products and chemical compositions.

In my co-pending, commonly assigned aforementioned parent patent application, sulfuric acid sulfonation of lignin has been employed to produce highly sulfonated lignin products suitable for use as dispersants and additives wherein the sulfonated lignins are soluble at most pH levels without appreciable precipitation.

BRIEF OBJECTS OF THE INVENTION

It is an object of the present invention to provide an improved method for producing a sulfonated lignin product for use as an additive in other chemical compositions and processes and having essentially complete water solubility at all pH levels with a high degree of sulfonation.

It is another object to provide an improved method of producing water-soluble sulfonated lignin products by direct oleum sulfonation of lignins.

It is a further object to provide an improved method of increasing the degree of sulfonation of lignins by reaction with oleum to produce a water-soluble sulfonated lignin product.

It is a further object to produce improved oleum sulfonated lignin products suitable for use as additives in other chemical processes and compositions.

SUMMARY OF THE INVENTION

The present invention is directed to the production of sulfonated lignin products and an improved method of producing the same by reaction of lignin compounds with oleum, i.e., sulfur trioxide in concentrated sulfuric acid, to provide a highly sulfonated lignin having essentially complete water solubility. More particularly, it has been found that reaction of a lignin compound with oleum, while maintaining the temperature of the reaction below about 40° C., and preferably below about 20° C., provides an essentially completely water-soluble lignosulfonate suitable for use commercially as an additive in other chemical compositions and processes. The lignin subsequently may be neutralized to form an alkali salt by treatment with a compound selected from the group consisting of lithium, sodium, potassium, ammonium, and amine salts.

The described oleum treatment has been found to provide a water-soluble sulfonated lignin product which, in the case of a sulfate lignin such as kraft lignin, contains at least about 4.2 moles of organically bound sulfonic acid per 1000 grams of lignin. When a starting kraft lignin material has not been previously sulfonated, the lignin after sulfonation with oleum contains at least about 4.2 moles sulfonic acid. When the starting kraft lignin material has been previously sulfomethylated, as with formaldehyde and a sulfite or bisulfite compound, further treatment and reaction with oleum in accordance with the method of the present invention increases sulfonation in the lignin product which has been found to produce an organically bound sulfonic acid content of up to as much as about 4.7 moles per 1000 grams of lignin. Both such sulfonated lignin products exhibit essentially complete water solubility at all pH levels.

DETAILED DESCRIPTION OF PREFERRED EMBODIMENTS

Lignin materials, which have been previously sulfomethylated, sulfonated, or are unsulfonated, may be effectively sulfonated by treatment with oleum, i.e., sulfur trioxide in concentrated sulfuric acid, by reaction therewith while maintaining the temperature of the reaction below about 40° C., and preferably below 20° C., for a sufficient period of time to obtain a sulfonated lignin product which is essentially completely water soluble at all pH levels.

The degree of solubility of such lignin compounds in aqueous medium may be measured by comparing their acid precipitation numbers, or values. As expressed herein, the acid precipitation number of a lignin compound is the number of grams of a 50% concentration of $H_2SO_4$ needed to start precipitation of a 37 milliliter solution of 0.5 weight percent lignin.

The method of the present invention may be illustrated by the following laboratory examples:

EXAMPLE 1

20 grams of a predried Indulin A lignin (unsulfonated) is dissolved for two hours at 110 in 80 grams of oleum ($H_2SO_4 + 30\%$ $SO_3$). The temperature of the reaction is maintained below 40° C., and preferably at or below 20° C., by outside cooling or by controlled lignin addition. After ten minutes, the oleum/lignosulfonate composition is poured into 500 grams of a mixture of ice and water so that the temperature does not exceed 40° C. To remove excess sulfuric acid, if desired, the completely dissolved solution thereof is diluted with about three times its volume of water and neutralized with lime. The neutralized slurry is filtered to remove calcium sulfate precipitate which forms from the interaction of the lime and sulfuric acid unconsumed in the sulfonation reaction, and to the filtrate is added the requisite amount of sodium carbonate quantitatively to convert the calcium salt of the desired sulfonic acid into its sodium salt. The resultant calcium carbonate precipitate may then be removed by filtration and the filtrate which contains the desired lignin salt evaporated to dryness according to any well-known drying procedure to provide the recovered sulfonated sodium salt of lignin which is essentially completely soluble in aqueous medium at all pH levels.

A number of lignin starting materials were sulfonated by oleum sulfonation in accordance with the present invention, and were compared to sulfuric acid sulfonation of lignins, as in my aforesaid co-pending application, and to prior art products not sulfonated with either sulfuric acid or oleum. The samples were treated to determine their acid precipitation numbers (solubility) and sulfonic acid content. The lignin samples with their acid precipitation numbers and sulfonic acid contents are set forth in the following table:

TABLE 1

| | SULFONIC ACID INCREASE OF VARIOUS LIGNINS AFTER OLEUM TREATMENT | | |
|---|---|---|---|
| Sample Number | Lignin | Acid Precipitation Number (Grams of 50% $H_2SO_4$) | Sulfonic Acid Content (Moles/ 1000 g Lignin) |
| 1 | INDULIN (unsulfonated) | 0.2 | 0.0 |
| 2 | INDULIN (8% moisture) sulfonated with $H_2SO_4$ | 10.5 | 1.7 |
| 3 | INDULIN (2% moisture) sulfonated with $H_2SO_4$ | 12.5 | 1.85 |
| 4 | INDULIN (8% moisture) sulfonated with Oleum | did not precipitate | 4.35/4.40 |
| 5 | REAX 83 (sulfomethylated) | 9.2 | 1.6 |
| 6 | REAX 83 (sulfomethylated) sulfonated with Oleum | did not precipitate | 4.35/4.40 |
| 7 | POLYFON O sulfonated with $Na_2SO_3$ | 3.4 | 1.1 |
| 8 | POLYFON O (sulfonated with $Na_2SO_3$) sulfonated with Oleum | did not precipitate | 4.25/4.40 |
| 9 | REAX 88 (sulfonated-sulfomethylated) | 15.0 | 2.4 |
| 10 | REAX 88 (sulfonated-sulfomethylated) sulfonated with Oleum | did not precipitate | 4.5 |

TABLE 1-continued

SULFONIC ACID INCREASE OF VARIOUS LIGNINS AFTER OLEUM TREATMENT

| Sample Number | Lignin | Acid Precipitation Number (Grams of 50% H$_2$SO$_4$) | Sulfonic Acid Content (Moles/ 1000 g Lignin) |
|---|---|---|---|
| 11 | REAX 100M (sulfonated-sulfomethylated) | 65 | 3.1 |
| 12 | REAX 100M (sulfonated-sulfomethylated) sulfonated with Oleum | did not precipitate | 4.72 |
| 13 | VANISPERSE CB (partially desulfonated sulfite lignin) | 1.7 | 0.7 |
| 14 | VANISPERSE CB (partially sulfonated sulfite lignin) sulfonated with Oleum | 95.5 | 3.3 |
| 15 | LIGNOSOL NSX 110 (sulfite lignin) | 10.9 | 1.83 |
| 16 | LIGNOSOL NSX 110 (sulfite lignin) sulfonated with Oleum | did not precipitate | 4.1/4.14 |

As indicated in Table 1, Samples 1-4 utilized as the starting material an Indulin ® lignin, which is an unsulfonated product. Samples 5 and 6 utilized as the starting material REAX 83, which is a lignin sulfomethylated with formaldehyde and a sulfite compound. Samples 7 and 8 utilized as the starting material Polyfon O, which is a sulfonated lignin produced by Westvaco, and sulfonated by treatment with sodium sulfite. Samples 9 and 10 utilized as the starting material REAX 88, which is a sulfonated and sulfomethylated lignin obtained by methylolation and sulfonation with a sulfite or bisulfite compound. Samples 11 and 12 utilized as the starting material a REAX 100 M lignin produced by Westvaco, which is sulfonated and sulfomethylated by methylation and sulfonation with a sulfite or bisulfite compound. Samples 13 and 14 are Vanisperse lignins obtained as a partially desulfonated sulfite lignin by-product of a sulfite wood-pulping process. Lignosol NSX 110 also is a sulfite lignin produced by Lignosol Corporation.

Samples 4, 6, 8, 10, 12, 14, and 16 of Table 1 represent lignin products which are sulfonated by direct oleum sulfonation in accordance with the present invention.

The lignin starting materials of Samples 1-12 are sulfate lignins, as produced as a by-product of a kraft wood-pulping process. Samples 14 and 16 illustrate the utility of the method of the present invention with sulfite lignins.

As can be seen, from the acid precipitation numbers presented (the acid precipitation number of 0.2 of Sample 1 represents a mildly acidic precipitation pH of approximately 6.5), the sulfate lignin samples sulfonated with oleum did not precipitate. In the case of the Vanisperse lignin, the sulfite lignin sulfonated with oleum exhibits an extremely high acid precipitation number, and thus, has excellent water solubility at both acid and alkaline pH levels. Similarly Sample 16, which is a sulfite lignin, has a slightly less sulfonic acid content that the oleum-treated sulfate lignins. Samples 2-4 illustrate the effect of moisture on the precipitation number and sulfonic acid content.

That which is claimed is:

1. A sulfonated lignin product having an organically bound sulfonic acid content of at least about 4.2 moles per 1000 grams lignin and having essentially complete water-solubility at all levels of pH prepared by the steps consisting essentially of dissolving a dry lignin compound, recovered as a by-product of kraft or sulfite wood pulping processes, in oleum while maintaining the temperature of the reaction below about 40° C. to sulfonate the lignin.

2. The sulfonated lignin of claim 1 wherein the dry lignin compound is a sulfomethylated lignin and the organically bound sulfonic acid content is up to about 4.7.

* * * * *